(12) United States Patent
Maruta

(10) Patent No.: US 6,729,700 B2
(45) Date of Patent: May 4, 2004

(54) TELEVISION SET, ITS CABINET, AND METAL MOLD FOR THE CABINET

(75) Inventor: Naoto Maruta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/282,246

(22) Filed: Oct. 29, 2002

(65) Prior Publication Data

US 2003/0090175 A1 May 15, 2003

(30) Foreign Application Priority Data

Nov. 15, 2001 (JP) .................................. 2001-007466 U

(51) Int. Cl.[7] .................................................. E04H 1/12
(52) U.S. Cl. ...................... 312/7.2; 348/843; 411/82.1; 411/930
(58) Field of Search ........................... 312/7.2; 348/836, 348/839, 843; 411/82.1, 82, 258, 930

(56) References Cited

U.S. PATENT DOCUMENTS 5,993,723 A  * 11/1999 Tanaka et al. ............... 264/500
6,432,350 B1 *  8/2002 Seres et al. .................. 264/500

FOREIGN PATENT DOCUMENTS

| JP | 2-87880 | * 3/1990 |
| JP | 10-264197 | 10/1998 |

* cited by examiner

*Primary Examiner*—Ramon O. Ramirez
(74) *Attorney, Agent, or Firm*—Crowell & Moring LLP

(57) ABSTRACT

A front section 10 of a cabinet is provided with a main channel 13a which takes a shortcut in front of display-supporting bosses 12 in boss-erected corner portions of a front plate and into which high-pressure gas is injected, subchannels 13c which pass under the display-supporting bosses 12, and choke channels 13b between the main channel 13a and the subchannels 13c to reduce the gas pressure. Therefore, screw holes 12a of the bosses 12 are not deformed by the high pressure of gas flowing through the subchannels 13c. Besides, recesses are made on both sides of a channel-forming zone in the boss-erected corner portions "C" of the front plate; therefore, the high-pressure gas is prevented from straying from the channel-forming zone.

6 Claims, 7 Drawing Sheets

TELEVISION SET, ITS CABINET, AND METAL MOLD FOR THE CABINET

BACKGROUND OF THE INVENTION

1. Field of the Invention

This invention relates to a television set, its cabinet, and a metal mold for the cabinet.

2. Description of the Prior Art

The conventional TV cabinet has structure as shown in FIG. 6.

FIG. 6 is an illustration of the configuration of the upper left corner of the back of the front plate of a conventional TV cabinet 1. The front plate of the TV cabinet 1 has a rectangular aperture 2. When a CRT is set in the TV cabinet 1, the fluorescent screen of the CRT faces ahead of the TV cabinet 1 through the aperture 2. In FIG. 6, numeral 3 is a boss to support the upper left corner (as seen from behind the CRT) of the CRT. Numeral 4 is a hollow gas channel extending through the base of the boss 3.

Resin is injected into the mold to form the case of the TV cabinet 1. While the case is cooling down, gas pressure is applied to the back of the case to prevent it from deforming or warping.

The gas channel 4 is used to apply the gas pressure to the back of the case of the TV cabinet 1. A zone, through which the gas channel 4 is to be made, is formed thicker than the average thickness of the case. When high-pressure gas is injected into the mold, it makes its way through the channel-forming zone to form the gas channel 4, because the inner portion of the thick channel-forming zone is slow in solidifying and hence still soft. Thus, gas pressure is applied to the back of the case to restrain it from deforming or warping.

However, in the previously described conventional TV, because the gas channel 4 extends through the bases of bosses 3 with longitudinal screw holes 3a, the gas channel 4 may expand and deform or warp the bottom portions of longitudinal screw holes 3a as shown in FIG. 7, causing the trouble that screws cannot properly be screwed into the screw holes 3a when a display is set in the cabinet.

SUMMARY OF THE INVENTION

In accordance with the above, it is the object of the present invention to provide a television set, its cabinet, and a metal mold for the cabinet which allow screws to be properly screwed into the screw holes of display-supporting bosses of the cabinet when a display such as a CRT is set in the cabinet.

To achieve the above object, the present invention provides a television set including a resin cabinet, which includes a case, display-supporting bosses, and a hollow gas channel in the neighborhoods of the bosses, all formed in one piece. The case has a front plate, and a rectangular aperture is made in the front plate. When a display is set in the case, its screen faces ahead of the cabinet through the rectangular aperture. The front plate of the case is formed thick in the neighborhood of each corner of the rectangular aperture. Formed erect on the back of the front plate in the neighborhood of each corner of the rectangular aperture is one of the display-supporting bosses. Each boss has a screw hole made along its longitudinal center axis. The gas channel includes a main channel, subchannels, and choke channels. The main channel is formed off the bosses and has gas-injecting spots. Extending under each boss is one of the subchannels, which is connected to the main channel by one of the choke channels. Recesses are made at small intervals in the back of the front plate, on both sides of the channel-forming zone, in the neighborhood of each corner of the rectangular aperture.

As described above, the present invention provides a television set with a cabinet which allows screws to be properly screwed into the screw holes of display-supporting bosses of the cabinet when a display is set in the cabinet.

The gas channel is provided to restrain the front plate of the case from deforming or warping while the case is cooling down in the mold. Namely, while the case is cooling down after resin is injected into the mold, high-pressure gas is injected into the mold to apply gas pressure to the front plate from its back. Accordingly, the front plate cools down under the gas pressure and thereby is restrained from deforming or warping.

The above gas channel is formed by high-pressure gas injected into the mold after the injection of resin. Namely, the mold is so shaped that a solid (not hollow) zone through which the gas channel is to be made will be formed thicker than the average thickness of the front plate of the case. Accordingly, the temperature of the channel-forming zone decreases more slowly than the temperature of the other portions of the front plate. Therefore, when the surfaces of the channel-forming zone in contact with the inner surfaces of the mold and the other portions of the front plate have solidified, the inner portion of the channel-forming zone has not solidified yet. The channel-forming zone includes a main zone, subzones, and choke zones.

At that moment, high-pressure gas is injected into the gas-injecting spots. Because the inner portion of the channel-forming zone is still soft, the high-pressure gas makes its way through the main zone of the channel-forming zone, forming the main channel.

Then, the high-pressure gas reaches the subzones and makes its way into them to form the subchannels.

The portions between the main zone and the subzones are the choke zones; therefore, the high-pressure gas makes its way through the choke zones, too, forming the choke channels.

The choke zones are thinner and narrower than the main zone and subzones; accordingly, the sectional area of the inner soft portion of the choke zone is smaller than those of the main zone and the subzone. Therefore, the choke channel is formed, given a smaller diameter than those of the main channel and the subchannel. Accordingly, the flow rate of the high-pressure gas from the main channel to the subchannel is reduced by the choke channel, which results in a lower gas pressure in the subchannel than the gas pressure in the main channel.

Thus, even if the above subchannel passes under the bottom portion of the display-supporting boss, the pressure of the high-pressure gas is reduced to such a degree that the high-pressure gas does not expand the diameter of the subchannel excessively to deform or warp the bottom portion of the screw hole of the boss.

The front plate of the case are formed thick in the neighborhood of each corner of the rectangular aperture to give the case sufficient strength; accordingly, the high-pressure gas may stray from the channel-forming zone in the neighborhood of each corner of the rectangular aperture. To prevent this from happening, in a cabinet of the invention, the recesses are made at small intervals in the back of the front plate, on both sides of the channel-forming zone, in the neighborhood of each corner of the rectangular aperture. Accordingly, even when the high-pressure gas strays from the channel-forming zone and tries to flow into the thick portions, it cannot form a gas channel because of the recesses. These recesses accelerate the solidification of recessed areas; therefore, although thick portions are provided in the case, the gas channel is formed through only the channel-forming zone.

In the above invention, the cabinet with particular configuration provided in the television set has been described. However, any configuration is acceptable provided that it can be formed by blow molding while restraining the screw holes of display-supporting bosses from deforming. From this aspect, it is possible to provide a cabinet of the invention in a broader sense.

The second aspect of the present invention provides a TV cabinet, which includes a case, display-supporting bosses, and a gas channel in the neighborhoods of the bosses, all formed in one piece. The gas channel includes a main channel, subchannels, and choke channels. The main channel is formed off the bosses and has gas-injecting spots. Extending under each boss is one of the subchannels, which is connected to the main channel by one of the choke channels.

According to the second aspect of the present invention, the screw holes of bosses to support any components in a television set can be restrained from deforming. Besides, the formation of the gas channel is not limited to a thick zone. If the gas channel is to be formed through a zone of the average thickness or a thin zone, it can be formed without providing thin portions, or recesses, on both sides of the zone.

Thus, the second aspect of the present invention provides a TV cabinet which allows screws to be properly screwed into the screw holes of display-supporting bosses when a display is set in the TV cabinet.

An example of the TV cabinet has thin portions on both sides of the channel-forming zone.

Namely, if the gas channel is to be formed through a thick zone of the case, it can be accomplished by providing thin portions on both sides of the thick zone.

Thus, according to the second aspect of the present invention, the gas channel is formed without its straying from the desired course.

Another example of the TV cabinet will follow. The case of the TV cabinet has a front plate. A rectangular aperture is made in the front plate. When a display is secured to the front plate, its screen faces ahead of the TV cabinet through the rectangular aperture. The front plate is formed thick in the neighborhood of each corner of the rectangular aperture. One of the display-supporting bosses is formed erect in the back of the front plate in the neighborhood of each corner of the rectangular aperture. Each boss has a screw hole made along its longitudinal center axis. Recesses are made at small intervals on both sides of the channel-forming zone in the neighborhood of each corner of the rectangular aperture.

Namely, the second aspect of the present invention is applicable to the front section of the cabinet of the television set of the first aspect in order to restrain the screw holes of display-supporting bosses from deforming.

Thus, according to this aspect of the invention, it becomes possible to restrain the screw holes of display-supporting bosses from deforming.

The third aspect of the present invention provides a metal mold to form the TV cabinet of the second aspect. An example of the metal mold includes (i) a mold surface to form a case, display-supporting bosses, and a channel-forming zone in the neighborhoods of the bosses, all in one piece, (ii) resin injection holes to inject resin into the mold, and (iii) gas injection holes to inject high-pressure gas into the mold. The case has a front plate, wherein a rectangular aperture is made. Formed in the neighborhood of each corner of the rectangular aperture is one of the bosses. The channel-forming zone includes a main zone, subzones, and choke zones. The main zone is thick and off the bosses and has gas-injecting spots overlapping the gas injection holes. Formed in the neighborhood of each corner of the rectangular aperture is one of the subzones, which is thick, extends under the boss in the neighborhood, and is connected to the main zone. Also formed in the neighborhood of each corner of the rectangular aperture is one of the choke zones, which is thinner and narrower than the main zone and connects the subzone in the neighborhood to the main zone.

Thus, the present invention can be embodied as a mold to form the TV cabinet of the second aspect of the present invention, too.

As described above, the third aspect of the present invention provides a mold to form a TV cabinet which allows screws to be properly screwed into display-supporting bosses when a display is set in the TV cabinet.

The mold surface of the above example of the metal mold may be so shaped that the neighborhood of each of the display-supporting bosses will be formed thick and recesses will be formed at small intervals on both sides of the channel-forming zone.

Namely, a gas channel can be formed without its straying from a desired course by contriving the pattern of the mold.

As described above, the third aspect of the present invention enables the formation of a gas channel through only a desired course.

DESCRIPTION OF THE PREFERRED EMBODIMENT

A preferred embodiment of the present invention will be described in the order below.
(1) The outline of a television set including a cabinet in accordance with the present invention
(2) The structure of the front section of the cabinet
(3) The formation of the front section of the cabinet
(4) Summary
(1) Outline of Television Set FIG. 1 is a schematic perspective view of an embodiment of television set of the present invention, showing the general configuration of the television set.

Figure 1:
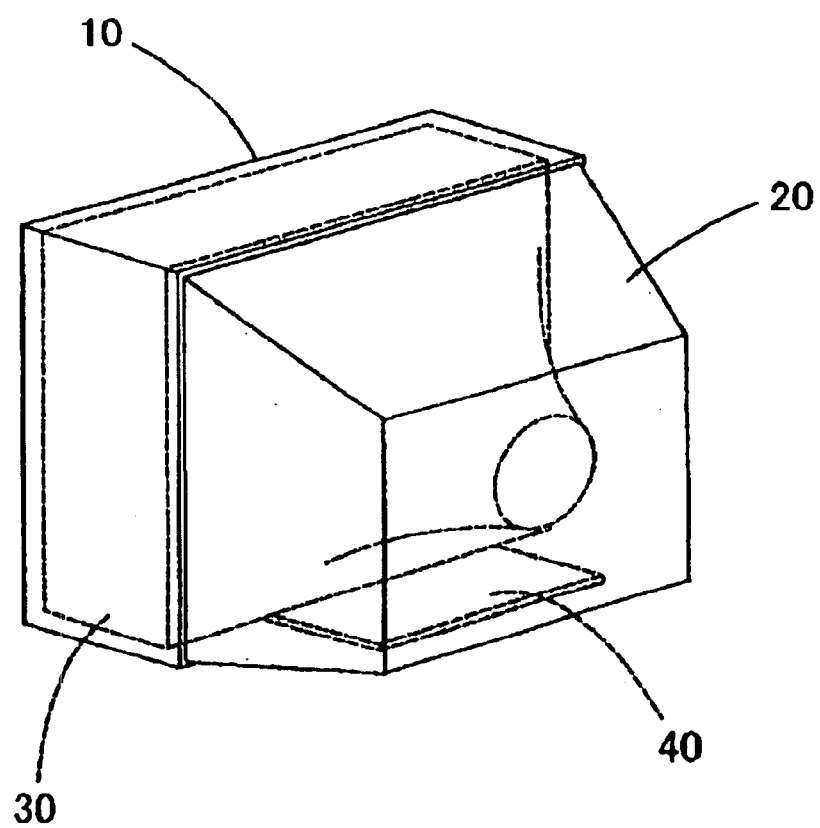
FIG. 1 is a schematic perspective view of an embodiment of television set of the present invention, showing the general configuration of the television set.

As shown in FIG. 1, the TV set comprises a cabinet including a front section 10 and a rear section 20, a CRT 30, and a control board 40.

The front section 10 of the cabinet has a rectangular aperture in its front plate. The bottom plate of the front section 10 is elongated backward to form a base plate on which the control board 40 is set.

The CRT 30 is secured to the front section 10 from behind it, its fluorescent screen directed ahead of the cabinet, and the control board 40 is set on the base plate of the front section 10. Then, the internal wiring is made and the rear section 20 is coupled with the front section 10 to complete a television set.

The CRT 30 is used in this embodiment, but the following description is applicable to TV cabinets with an LCD or a plasma display.

(2) Structure of Front Section of Cabinet

Figure 2:
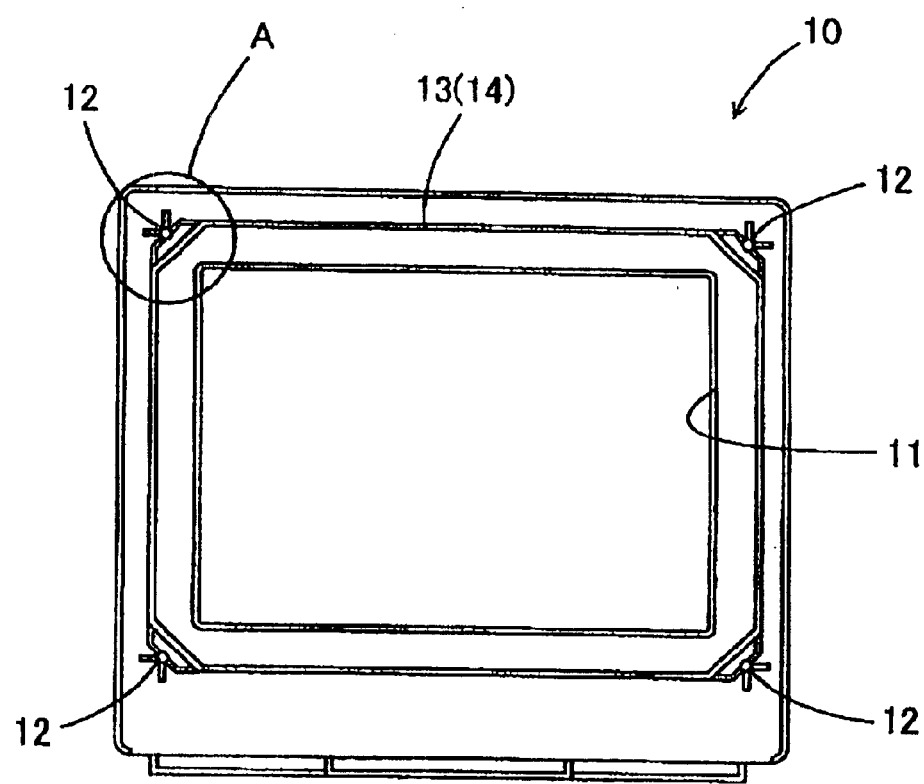
FIG. 2 is a plan view of the back of the front section of the cabinet of the television set of FIG. 1.
Figure 3:
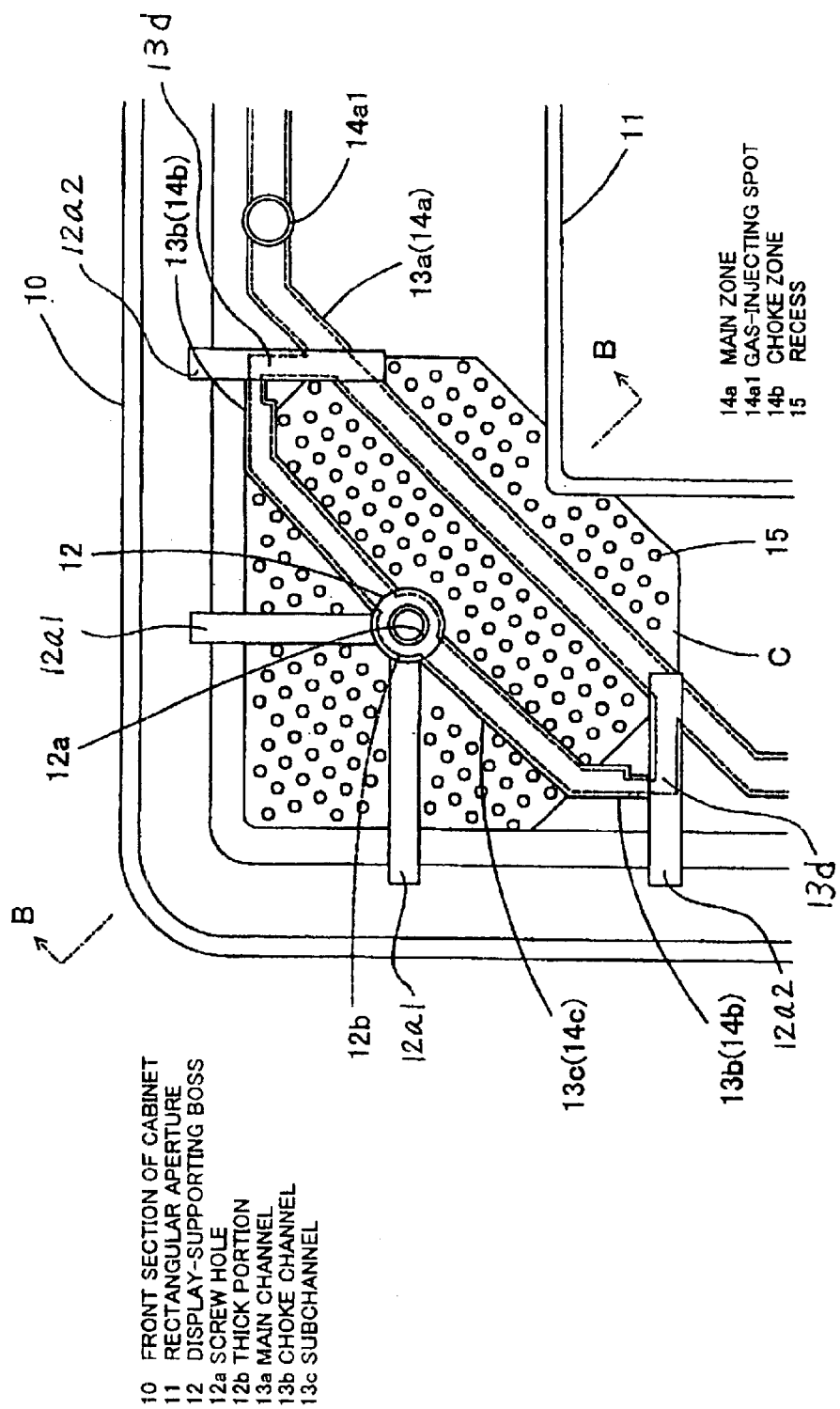
FIG. 3 is an enlarged plan view of the corner "A" of FIG. 2.
Figure 4:
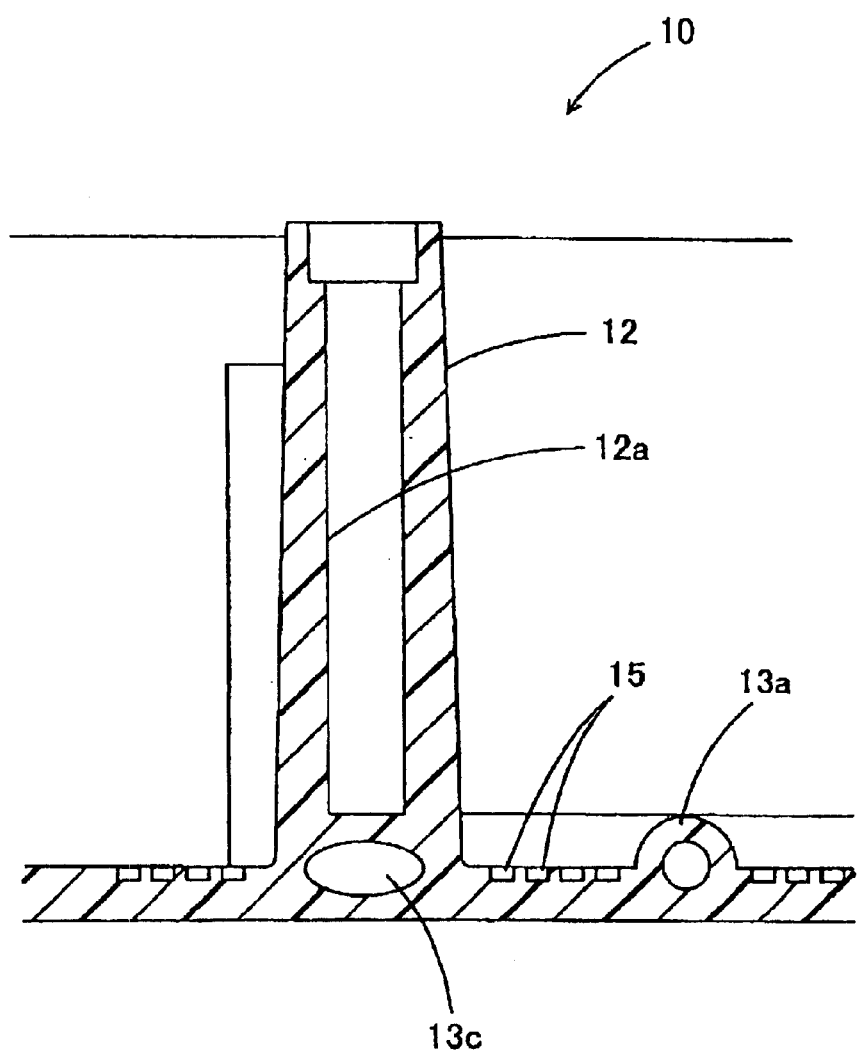
FIG. 4 is a sectional view taken along the arrowed line B—B of FIG. 3.

FIG. 2 is a plan view of the back of the front section 10 of the cabinet. FIG. 3 is an enlarged plan view of the neighborhood "A" of the upper right boss 12 of FIG. 2. FIG. 4 is a sectional view taken along the arrowed line B—B of FIG. 3. As shown in FIGS. 2 to 4, a column-like boss 12 is formed erect in the neighborhood of each of the four corners of the rectangular aperture 11 (the neighborhood will hereinafter be referred to as "boss-erected corner portion"). Each boss 12 has a screw hole "12a" along its longitudinal center axis. The CRT 30 has a lug with a screw hole at each corner of its fluorescent screen. The CRT 30 is screwed to the front section 10 by screwing screws into the screw holes 12a through the screw holes of the lugs. Each boss 12 has two plate-like reinforcing ribs 12a1, one rib extending from said boss horizontally in the opposite direction to the rectangular aperture 11, the other extending vertically in the opposite direction to the same. These ribs 12a1 reinforce the bosses 12 so that the latter can bear the weight of the CRT 30.

A gas channel 13 is formed in the front plate of the front section 10, going round the rectangular aperture 11 through the boss-erected corner portions. The gas channel 13 comprises a main channel 13a, connecting channels 13d, choke channels 13b, and subchannels 13c. As previously described, a channel formed along the four sides of the rectangular aperture 11 is the main channel.

As shown in FIG. 3, the main channel 13a goes along the four sides of the rectangular aperture 11 and turns inside by 45° at each corner to take a shortcut. Thus, the main channel 13a includes four straight sections parallel to the four sides of the rectangular aperture 11 and four shortcuts at the four corners, taking an octagonal shape. Each shortcut is outside the corresponding corner of the rectangular aperture 11 and inside the corresponding boss 12.

A subchannel 13c is formed in each boss-erected corner portion. In each boss-erected corner portion, the subchannel 13c is generally straight and parallel to the shortcut of the main channel 13a and extends under the boss 12. Each of the two end portions of the subchannel 13c bends inside by 45° to be parallel to the corresponding side of the front plate of the front section 10. Each end of the subchannel 13c connects with the shortcut of the main channel 13a by a choke channel 13b and a connecting channel 13d. The choke channels 13b are provided to adjust the gas pressure. Each choke channel 13b bends by 90° to connect the corresponding end of the subchannel 13c to the corresponding connecting channel 13d which connects directly with the shortcut. Two plate-like ribs 12a2 are provided to form the two connecting channels 13d in each boss-erected corner portion. One of the ribs 12a2 is parallel to, and at a prescribed distance from, one of the two reinforcing ribs 12a1 and the other rib 12a2 is parallel to, and at a prescribed distance from, the other reinforcing rib 12a1.

(3) Formation of Front Section of Cabinet

Figure 5:
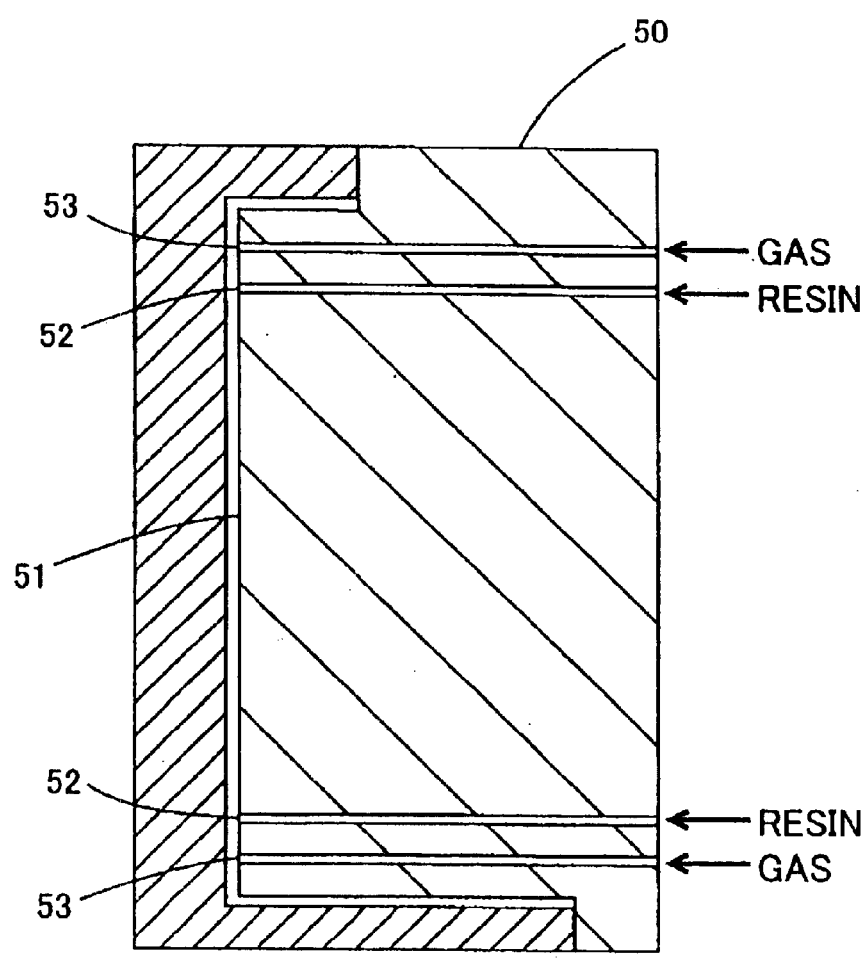
FIG. 5 is a schematic sectional view of a metal mold to form the front section of the cabinet of FIG. 2.
Figure 6:
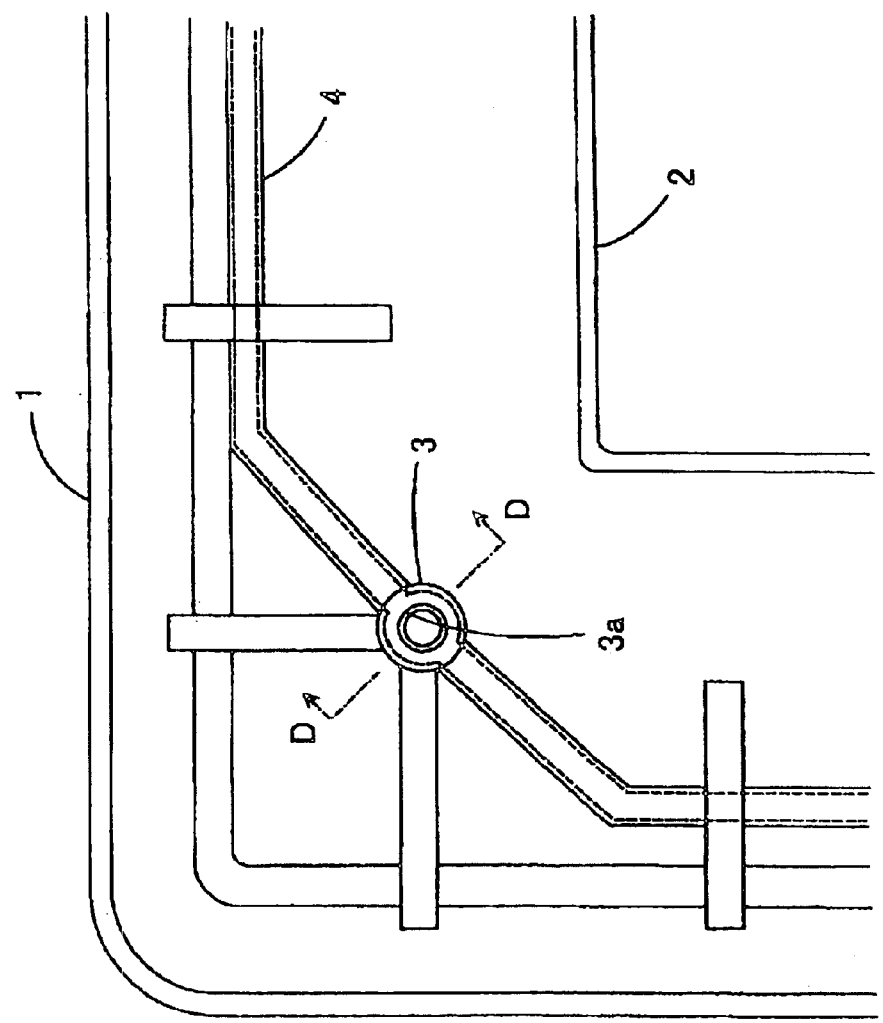
FIG. 6 is an illustration of the configuration of the upper left corner of the back of the front section of a conventional television cabinet.
Figure 7:
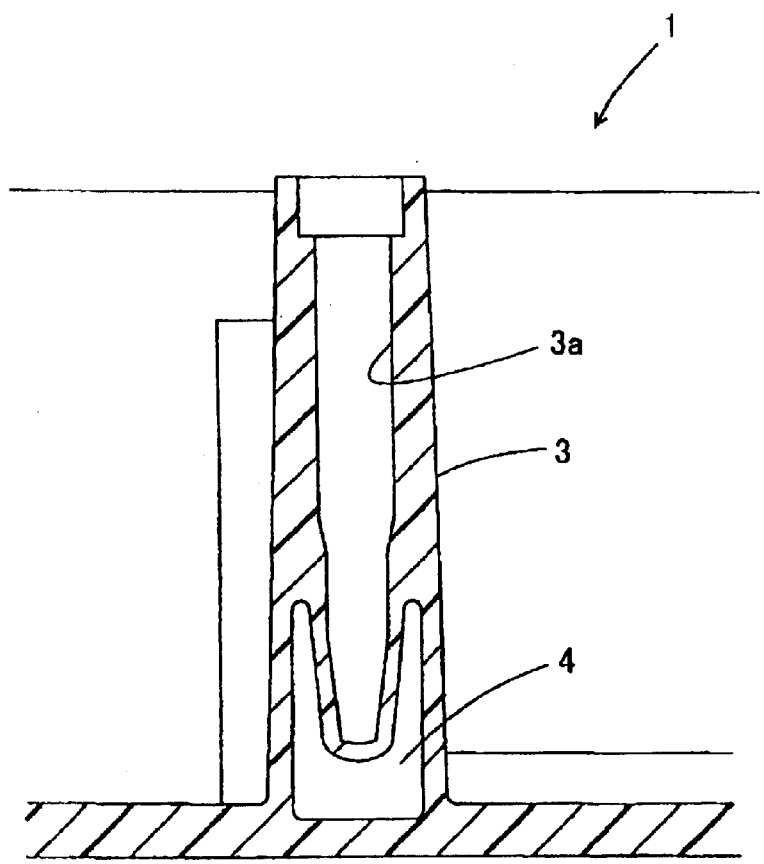
FIG. 7 is a sectional view taken along the arrowed line D—D of FIG. 6.

FIG. 5 is a schematic sectional view of a metal mold 50 to form the front section 10 of the cabinet by blow molding.

As shown in FIG. 5, a gap is formed in the mold and a mold surface 51 is provided on an inner wall surface to form the back of the front plate of the front section 10.

A plurality of resin injection holes 52 and a plurality of gas injection holes 53 are made in the surface 51. Melted resin is injected into the mold 50 through the resin injection holes 52; high-pressure gas, through the gas injection holes 53.

The procedure for forming the front section 10 of the cabinet will be described below.

First, resin is injected into the mold 50 through the resin injection holes 52. Formed in the surface 51 are the back surface of the front plate of the front section 10 and the shapes of bosses 12 with screw holes 12a and a zone 14 through which the gas channel 13 is to be made; accordingly, the front section 10 is formed when resin is injected into the mold 50.

The front plate, except the boss-erected corner portions, of the front section 10 is formed relatively thin, whereas the boss-erected corner portions (portions "C" in FIG. 3), the display-supporting bosses 12 and the channel-forming zone 14 are formed relatively thick. The surface 51 has a plurality of projections to make recesses 15 on both sides of the channel-forming zone 14 in the boss-erected corner portions "C" of the front panel as shown in FIG. 3. The projections are arranged at very small intervals as compared with the width of the gas channel 13. At this point of time, the channel-forming zone 14 is solid (not hollow).

Two to three seconds after the injection of resin into the mold 50, high-pressure gas is injected into the mold 50 through the gas injection holes 53. The channel-forming zone 14 includes a main zone 14a for forming the main channel 13a, choke zones 14b for forming the choke channels 13b, and subzones 14c for forming the subchannels 13c, all formed continuously. The gas injection holes 53 overlap gas-injecting spots 14a1 provided in the main zone 14a.

As soon as the resin is injected into the metal mold 50, the resin begins to solidify. The relatively thin areas of the front plate of the front section 10 decrease rapidly in temperature and solidify to such a degree in two to three seconds that they do not deform under the high pressure of gas. On the other hand, although the surfaces of the relatively thick channel-forming zone 14 and boss-erected corner portions in contact with the inner surfaces of the mold 50 decrease rapidly in temperature and solidify to a degree similar to the degree of solidification of the relatively thin areas, their inner portions decrease slowly in temperature and do not solidify in two to three seconds.

Accordingly, when high-pressure gas is injected into the gas-injecting spots 14a1, the gas makes its way through the unsolidified zone 14 to form the gas channel 13. Specifically, the high-pressure gas makes its way through the main zone 14a around the rectangular aperture 11 to form the main channel 13a.

When the high-pressure gas reaches a boss-erected corner portion of the front plate, it makes its way through the bases of the ribs 12a2 to form the connecting channels 13d, each rib 12a2 straddling the main loop zone 14a. The high-pressure gas makes its way further into the choke zones 14b to form the choke channels 13b. It advances further into the subzone 14c to form the subchannel 13c.

The choke zones 14b are narrower and thinner than the other portions of the zone 14; therefore, pressure of high-pressure gas is reduced in the choke zones 14*b* before the high-pressure gas makes its way into the subzones 14*c*, which results in a lower gas pressure in the subchannels 13*c* than the gas pressure in the main channel 13*a*.

Thus, the high-pressure gas injected through the gas-injecting spots 14*a*1 forms the gas channel 13 including the main channel 13*a*, connecting channels 13*d*, choke channels 13*b*, and subchannels 13*c* through the relatively thick channel-forming zone 14.

Besides, the choke zone 14*b* is narrower and thinner than the main zone 14*a* and the subzone 14*c*; therefore, the sectional area of the unsolidified inner portion of the choke zone 14*b* which allows the high-pressure gas to make its way through is relatively small and hence the choke channel 13*b* is formed, given a smaller diameter than those of the main channel 13*a* and the subchannel 13*c*.

Accordingly, when the high-pressure gas flows from the main channel 13*a* into the choke channel 13*b*, the flow rate of gas is reduced; therefore, the pressure of the gas flowing from the choke channel 13*b* into the subchannel 13*c* is lower than the gas pressure in the main channel 13*a*. Because the gas pressure in the subchannel 13*c* extending under the boss 12 is reduced, the reduced pressure does not deform or warp the bottom portion of the screw hole 12*a* of the boss 12.

The base 12*b* of the boss 12 is circular and thick. The high-pressure gas flowing into the subchannel 13*c* reaches the base 12*b* where the subchannel 13*c* expands in diameter and takes a disc-like shape, further reducing the gas pressure in the subchannel 13*c*.

As described above, the front plate of the front section 10 of the cabinet is prevented from deforming or warping while it is cooling down in the mold 50 by injecting high-pressure gas into the mold 50 and allowing the gas to make the gas channel 13 and apply its high pressure to the resin around the gas channel 13.

Because the four boss-erected corner portions (portions "C" in FIG. 3) of the front plate of the front section 10 are formed thick to give the front plate enough strength, the high-pressure gas flowing through the main channel 13*a*, etc. and injected into the mold 50 can stray from the channel-forming zone 14 into the thick areas on both its sides.

To prevent the high-pressure gas from straying from the channel-forming zone 14, when forming the corner portions around the rectangular aperture 11 by the mold surface 51, a plurality of recesses (spots where the plate thickness is reduced) 15 are made at small intervals on both sides of the channel-forming zone 14 in the boss-erected corner portions of the front plate when the front section 10 is formed in the mold 50. These recesses 15 accelerate the cooling down of resin in the recessed areas and thereby prevent the high-pressure gas from straying from the channel-forming zone 14.

To form the gas channel 13 in the desired zone alone, other methods may be used such as reducing the thickness of the outline of the gas channel 13 in the boss-erected thick corner portions (the portions "C" in FIG. 3) of the front plate of the front section 10.

(4) Summary

As described above, the front section 10 of the cabinet is provided with (i) the main channel 13*a* which takes a shortcut in front of the display-supporting bosses 12 in the boss-erected corner portions of the front plate and into which high-pressure gas is injected, (ii) the subchannels 13*c* which pass under the display-supporting bosses 12, and (iii) the choke channels 13*b* between the main channel 13*a* and the subchannels 13*c* to reduce the gas pressure. Therefore, the screw holes 12*a* of the bosses 12 are not deformed by the high pressure of gas flowing through the subchannels 13*c*.

Besides, the recesses 15 are made on both sides of the channel-forming zone 14 in the boss-erected corner portions "C" of the front plate; therefore, the high-pressure gas is prevented from straying from the channel-forming zone 14.

What is claimed is:

1. A television set including a cabinet, which includes:

a case having a front plate in which a rectangular aperture is made, a screen of a display facing ahead of the cabinet through the rectangular aperture when the display being set in the case, and the front plate of the case being formed thick in the neighborhood of each corner of the rectangular aperture, display-supporting bosses, each of them being formed erect in the back of the front plate in the neighborhood of each corner of the rectangular aperture and having a screw hole made along its longitudinal center axis, and a hollow gas channel in the neighborhoods of the bosses, all formed in one piece;

wherein said gas channel includes a main channel formed off said bosses and having gas-injecting spots, subchannels and choke channels, and wherein extending under each boss is one of the subchannels, which is connected to the main channel by one of the choke channels, and recesses are made at small intervals on both sides of said gas channel in the neighborhood of each corner of said rectangular aperture.

2. A TV cabinet including a case, display-supporting bosses and a hollow gas channel in the neighborhoods of the bosses, all formed in one piece; wherein said gas channel includes a main channel formed off said bosses and having gas-injecting spots, subchannels and choke channels, each of the subchannels extending under each boss and being connected to the main channel by one of the choke channels.

3. A TV cabinet according to claim 2, wherein recesses are made on both sides of said gas channel.

4. A TV cabinet according to claim 3;

wherein said case of the TV cabinet has a front plate in which a rectangular aperture is made and a screen of a display faces ahead of the TV cabinet through the rectangular aperture when the display is set in the case, and wherein the front plate of the case is formed thick in the neighborhood of each corner of the rectangular aperture, each of said display-supporting bosses is formed erect in the back of the front plate in the neighborhood of each corner of the rectangular aperture and has a screw hole made along its longitudinal center axis, and said recesses are made at small intervals on both sides of said gas channel in the neighborhood of each corner of the rectangular aperture.

5. A metal mold for a TV cabinet including:

a mold surface to form a case, display-supporting bosses, and a channel-forming zone in the neighborhoods of the bosses by blow molding, all in one piece, resin injection holes to inject resin into the mold, and gas injection holes independently formed of the resin injection holes to inject gas into the channel-forming zone;

wherein the case has a front plate in which a rectangular aperture is made, and each of the bosses is formed in the neighborhood of each corner of the rectangular aperture, wherein the channel-forming zone includes a main zone, subzones and choke zones, wherein the main zone is thick and off the bosses and has gas-injecting spots overlapping the gas injection holes, and formed in the neighborhood of each corner of the rectangular aperture is one of the subzones, which is thick, extends under the boss in the neighborhood, and is connected to the main zones, and wherein formed in the neighborhood of each corner of the rectangular aperture is one of the choke zones, which is thinner and narrower than the main zone and connects the subzone in the neighborhood to the main zone.

6. A metal mold for a TV cabinet according to claim 5, wherein said mold surface of the metal mold is so shaped that the neighborhood of each of said display-supporting bosses will be formed thick and recesses will be formed at small intervals on both sides of said channel-forming zone.

* * * * *